Figure 1:
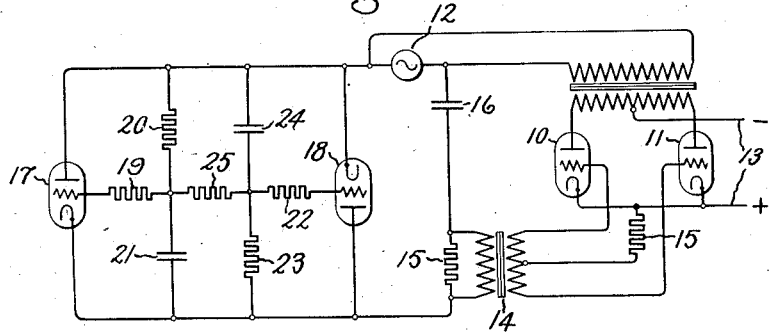

June 9, 1936.  B. R. TEARE, JR  2,043,844
ELECTRIC CONTROL CIRCUITS
Original Filed March 30, 1931

Inventor:
Benjamin R. Teare Jr.
by Charles E. Tullar
His Attorney.

Patented June 9, 1936

2,043,844

UNITED STATES PATENT OFFICE

2,043,844

ELECTRIC CONTROL CIRCUITS

Benjamin R. Teare, Jr., Schenectady, N. Y., assignor to General Electric Company, a corporation of New York Application March 30, 1931, Serial No. 526,326
Renewed December 3, 1935

8 Claims. (Cl. 250—27)

My invention relates to electric control circuits and more particularly to such circuits suitable for supplying excitation to discontinuous control electric valves.

Heretofore there have been devised various circuits utilizing discontinuous control electric valves for controlling, regulating or converting electrical energy. In securing the desired control, regulation or conversion, the use of discontinuous control electric valves, such for example as vapor electric discharge valves, has been found particularly advantageous because of the relatively large amounts of power which may be handled at ordinary operating voltages. By the term discontinuous control electric valve, I mean that type of electric valve in which the starting of current through the valve is determined by the excitation of a control electrode, but in which the current through the valve may be interrupted only by reducing the anode potential below a critical value. This type of valve is to be distinguished from a continuous control electric valve of which the high vacuum pure electron discharge valve is a typical example, in which the instantaneous current through the valve is continuously determined by the excitation of a control electrode. In the excitation of a plurality of discontinuous control electric valves it has been found desirable to use an alternating grid potential comprising a series of symmetrically spaced impulses having very steep wave fronts. In a copending application of B. D. Bedford, Serial No. 485,335, filed September 29, 1930, and assigned to the same assignee as the present application, there is disclosed and claimed an arrangement for exciting the grid of a discontinuous control electric valve with a periodic potential of peaked wave form which has the desired characteristics. It has been found that in an arrangement such as disclosed in that application utilizing a periodic potential of peaked wave form there is sometimes required more energy for grid excitation than can be obtained through ordinary insulating transformers such as are usually associated with such grid circuits.

It is an object of my invention to provide an improved control circuit which is particularly suitable for exciting the grid of a discontinuous control electric valve which will overcome the above mentioned disadvantages of the arrangements of the prior art, and which will be simple, economical and reliable in operation.

It is a further object of my invention to provide an improved control circuit which is particularly suitable for exciting the grids of a plurality of discontinuous control electric valves which will provide symmetrically spaced periodic impulses of steep wave front and which will supply a maximum amount of control energy.

In accordance with my invention a grid circuit of a discontinuous control electric valve is energized from a source of alternating potential in series with a pair of discontinuous control electric valves reversely connected in parallel; that is, with the anode of one valve connected to the cathode of the other. The grids of these auxiliary valves are energized from the same source of alternating potential through any suitable impedance network for retarding the phase of the grid potentials substantially 90 degrees behind the anode potentials of the valves. A capacitor is also preferably included in series with the grid circuit of the valve to be controlled. With such an arrangement, each of the auxiliary valves is rendered conducting at or near the peak of its positive anode potential so that the potential applied to the series circuit comprising the capacitor and the grid circuit consists of a series of symmetrically spaced quarter sine waves having very steep wave fronts. The capacitor serves to distort this wave form in such a way as to provide a very sharp peak of grid potential.

Figure 2:
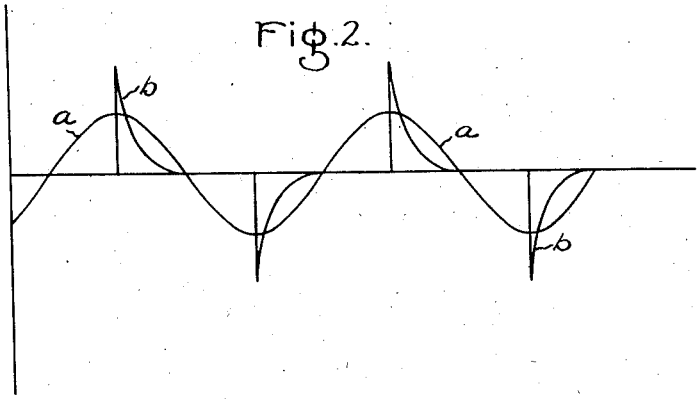

For a better understanding of my invention together with other and further objects thereof, reference is had to the following description taken in connection with the accompanying drawing and its scope will be pointed out in the appended claims. Fig. 1 of the accompanying drawing illustrates my invention as applied to the control of a pair of discontinuous control electric valves connected in a well known manner to secure full wave rectification of an alternating current, while Fig. 2 is a reproduction of certain wave forms to aid in the understanding of my invention.

Referring now to Fig. 1 of the drawing, I have shown an arrangement for controlling the excitation of a pair of discontinuous control electric valves 10 and 11 adapted to transmit energy from a source of alternating current 12 to a direct current circuit 13. The grids of the valves 10 and 11 are connected to their common cathode circuit through opposite halves of the secondary winding of a grid transformer 14 and a current limiting resistor 15. The primary winding of grid transformer 14 is energized from a resistor which comprises one element of my improved electric control circuit. This arrangement comprises a series circuit energized from the alternating current source 12 and includes a capacitor 16, a resistor 15 and a pair of discontinuous control electric valves 17 and 18 reversely connected in parallel. The grid of the valve 17 is connected through a current limiting resistor 19 to a phase shifting circuit comprising a resistor 20 and a capacitor 21 connected across the terminals of the valves. Similarly the grid of the valve 18 is connected through a current limiting resistor 22 to a phase shifting circuit comprising a resistor 23 and a capacitor 24 also connected across the terminals of the valves. In each case the capacitors of the phase shifting circuit are connected between the grid and the cathode of the valve. In some cases it may be desirable to connect a resistor 25 between the midpoints of the phase shifting circuits in order to maintain the symmetry of the grid network and to provide a discharge path for capacitors 21 and 24.

The general principles of operation of a full wave rectifier will be well understood by those skilled in the art, so that an explanation of the manner in which alternating current supplied by the source 12 is rectified and delivered to the direct current circuit 13 is not considered necessary. It is also well understood that the average output of such an arrangement may be controlled by retarding the phase of the grid potentials of the electric valves 10 and 11 with respect to the anode potentials of these valves. It is important for the satisfactory operation of such an arrangement, as well as many others utilizing discontinuous control electric valves, that each of the electric valves shall be rendered conducting at the same point in its respective half cycle of positive anode potential. In order to insure that each of the valves becomes conducting at this same point in spite of slight differences in their characteristics or operating conditions, it is necessary to have a grid potential with a very steep wave front such as is provided, for example, by means of a peaked wave. This is provided by means of the above described apparatus because of the fact that the grid network of the auxiliary valves 17 and 18 is so adjusted that each of these valves is rendered conducting at substantially the peak of its half cycle of positive anode potential, this delay in the excitation of the valves 17 and 18 being due to the phase retarding capacitors 21 and 24. The result is that the circuit including the valves 17 and 18 impresses a periodic potential comprising a series of quarter sine waves upon the resistor 15 and capacitor 16 in series. The resultant potential appearing across the resistor 15 and applied to the grid transformer 14 is illustrated by the curve b of Fig. 2 in which the curve a represents the sine wave of alternating potential supplied by the source 12. It will be noted that the wave of the curve b has a very steep wave front and at the same time an area corresponding to an appreciable amount of energy to permit any necessary transformation. In certain instances it may be found that the capacitor 16 may be omitted, the undistorted quarter sine waves having satisfactory characteristics. The amount of distortion will decrease directly with an increase in capacitance of the element 16; an infinite capacitance, with no distortion, corresponding to an omission of the capacitor. While a phase shifting arrangement has been omitted for the sake of simplicity, it will be apparent to those skilled in the art that such a circuit may be inserted between the alternating current source 12 and the grid transformer 14 in order to control the output of the direct current circuit 13 without departing from my invention.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:—

1. In combination, a discontinuous control electric valve comprising an anode, a cathode, and a control grid, a grid circuit therefor including a source of alternating current and a second electric valve having a control grid, and means connected across said second valve and to said control grid for rendering said second valve conductive only near the peaks of the wave of alternating potential.

2. In combination, a discontinuous control electric valve comprising an anode, a cathode, and a control grid, a grid circuit therefor including a source of alternating current and a second electric valve provided with an anode, a cathode, and a control grid, and means for energizing the control grid of said second electric valve with an alternating potential lagging its anode potential by substantially 90 electrical degrees.

3. In combination, a discontinuous control electric valve comprising an anode, a cathode, and a control grid, a grid circuit therefor including a source of alternating current and a second electric valve provided with an anode, a cathode, and a control grid, a capacitance phase shifting circuit connected across said second valve, and a connection from the grid of said second valve to said phase shifting circuit.

4. In combination, a discontinuous control electric valve comprising an anode, a cathode, and a control grid, a grid circuit therefor including a source of alternating current, a capacitor and a second electric valve, and means for rendering said second valve conductive only near the peaks of the wave of alternating potentials.

5. Apparatus for generating a periodic potential of peaked wave form comprising an alternating current supply circuit, a load circuit including a capacitor, an electric valve interconnecting said circuits to transmit energy therebetween, and means for rendering said valve conductive near the peaks of the wave of alternating potential.

6. Apparatus for generating a periodic potential of peaked wave form comprising an alternating current supply circuit, a load circuit including a resistor and a capacitor, means for interconnecting said circuits including an electric valve provided with an anode, a cathode, and a control grid, and means for impressing upon said grid an alternating potential which lags the anode potential of said valve by substantially 90 electrical degrees.

7. Apparatus for generating a periodic potential of peaked wave form comprising an alternating current supply circuit, a load circuit including a resistor and a capacitor, means for interconnecting said circuits including a pair of electric valves reversely connected in parallel, each of said valves being provided with a control grid, a capacitance phase shifting bridge connected across said valves, and a connection from the electrical midpoint of said bridge to the grids of said valves.

8. In combination, a discontinuous control electric valve comprising an anode, a cathode, and a control grid, a grid circuit therefor energized from a series circuit including a source of alternating current, a capacitor, and a second electric valve having a control grid, and means connected to said control grid for maintaining said second valve nonconducting during the initial portion of each positive half cycle.

BENJAMIN R. TEARE, Jr.